United States Patent
Ayres

[11] Patent Number: 6,156,140
[45] Date of Patent: Dec. 5, 2000

[54] PROCESS FOR CREATING A PROTECTIVE SPLIT SLEEVE

[75] Inventor: John D. Ayres, Hampshire, United Kingdom

[73] Assignee: 3M Innovative Properties Company, St. Paul, Minn.

[21] Appl. No.: 09/169,682

[22] Filed: Oct. 9, 1998

[51] Int. Cl.[7] .............................. B32B 31/00; B32B 31/12
[52] U.S. Cl. .............................. 156/66; 156/84; 156/259; 264/163; 264/342 R; 285/45; 428/34.9
[58] Field of Search .............................. 264/230, 342 R, 264/146, 163; 174/DIG. 8, DIG. 11; 156/66, 84, 249, 259; 428/34.9, 35.1; 29/890.08; 285/45, 373, 419; 403/344

[56] References Cited

U.S. PATENT DOCUMENTS

| | | |
|---|---|---|
| 3,297,819 | 1/1967 | Wetmore . |
| 3,717,717 | 2/1973 | Cunningham et al. . |
| 4,390,745 | 6/1983 | Böttcher et al. . |

FOREIGN PATENT DOCUMENTS

| | | |
|---|---|---|
| 0 076 671 A2 | 4/1983 | European Pat. Off. . |
| 0 443 152 A1 | 8/1991 | European Pat. Off. . |
| 1155470 | 6/1969 | United Kingdom . |
| 1 381 770 | 1/1975 | United Kingdom . |

*Primary Examiner*—Adrienne C. Johnstone
*Attorney, Agent, or Firm*—Matthew B. McNutt

[57] ABSTRACT

A process for creating a jacket for the protection of an extended object and the article produced by the process. The process includes the steps of selecting a heat-shrinkable tube having a size corresponding to the object to be protected; providing a mold body having external dimensions substantially matching dimensions of the object to be protected; placing the heat-shrinkable tube over the mold body; applying heat to the heat-shrinkable tube to cause the heat shrinkable tube to conform to the shape of the mold body; cutting the heat-shrinkable tube longitudinally to create an open sleeve with first and second lateral sides; and removing the open sleeve from the mold body. Preferably, a fastening means is provided on the lateral sides of the open sleeve to allow the sleeve to be secured tightly about the object to be protected.

12 Claims, 3 Drawing Sheets

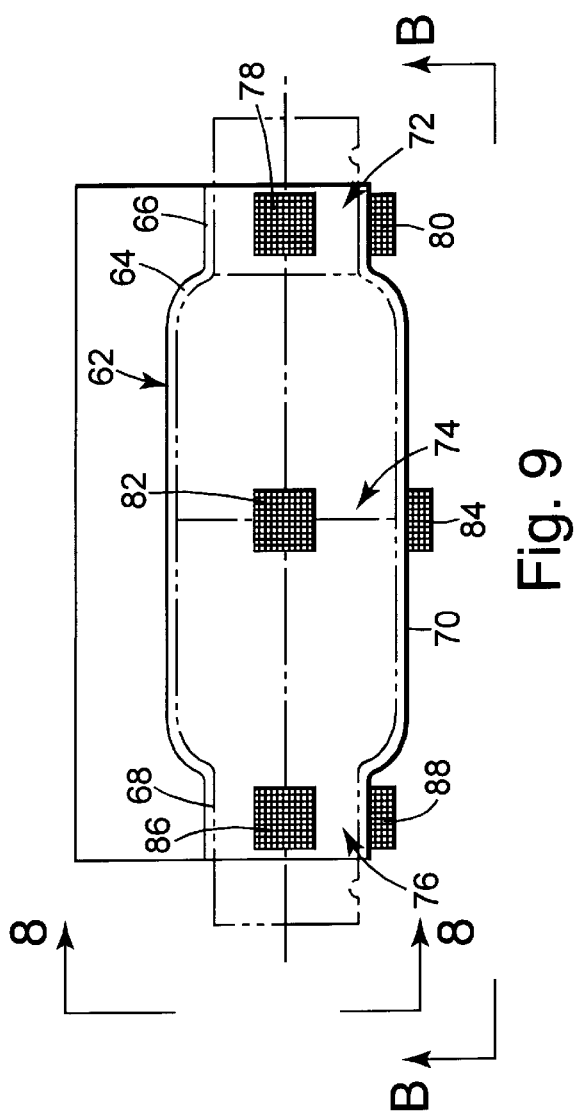
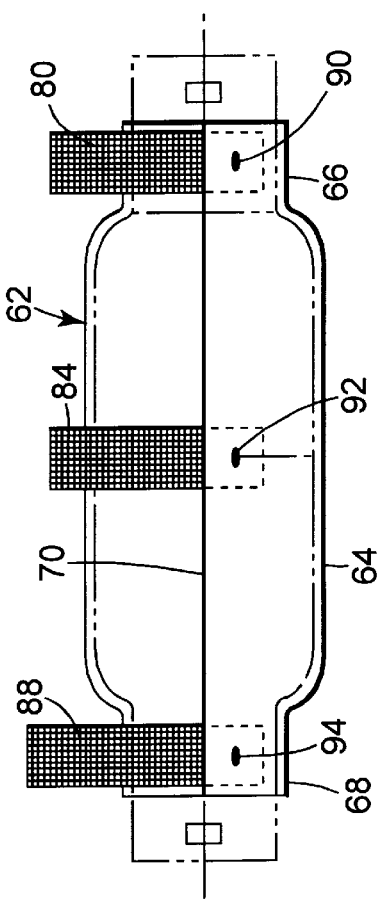
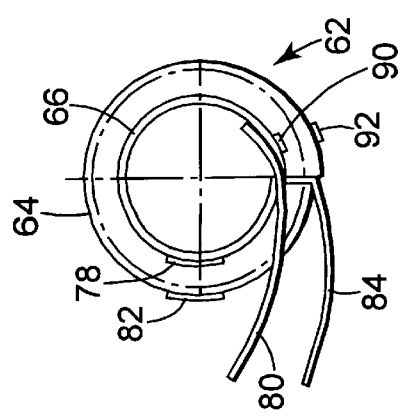

PROCESS FOR CREATING A PROTECTIVE SPLIT SLEEVE

FIELD OF THE INVENTION

The present invention relates to a process for creating a protective jacket for the temporary protection of an article having a generally extended or longitudinal geometry. The invention also relates to the protective jacket itself as obtained by such a process.

BACKGROUND OF THE INVENTION

There is a general need for a device which provides temporary protection of various articles, particularly articles which have a generally extended or longitudinal shape. The need for temporary protection typically occurs when these articles have to be transported, such as from a production site to either a secondary site or the end user of the article. Although there are many such articles which require temporary protection, the invention as described herein is used for the protection of automobile exhaust systems. Of course, it will be readily recognized that the invention described herein may be easily adapted and used for protecting many different types of articles.

The components of an exhaust system typically include several longitudinal tubes and exhaust parts which are linked together through one or more flexible unit, such as heat-resistant flexible tubes or hoses. While such exhaust systems are relatively common, problems often occur when the exhaust system is completely assembled as a "sub-assembly" at a first manufacturing site and then transported to a second manufacturing site, where the exhaust system is installed into a vehicle. Such sub-assemblies are becoming more common as automobile manufacturers purchase completed automobile sub-systems (such as exhaust systems, dashboards, interiors, etc.) from different manufacturing sources and then assemble the sub-systems into the final vehicle.

During transportation of an exhaust system sub-assembly, the various components must be securely held in their final relative positions, otherwise the flexible connections between the components can become loose or be damaged. One possible method for achieving this requirement is to temporarily assemble the components onto a rigid holding device. However, this method is a time-consuming and thus expensive process.

Another option is to simply reinforce the flexible component and its connection to the adjacent exhaust pipes in some manner. Again, however, any reinforcing method should be as simple and cost effective as possible. Due to the wide variety of exhaust systems which are transported and the relatively limited number of identical sub-systems to be transported, a mass produced reinforcement part, such as a rigid molded cover, would not be suitable, as the tooling costs for providing multiple shapes of molded covers would typically be too expensive. Another possibility would be to use heat-shrinkable articles, as e.g. described for electrical splices in U.S. Pat. Nos. 3,297,819; 3,717,717; and 4,390,745. Such heat-shrinkable articles are easily adapted to different shapes and configurations. In their original form, however, heat-shrinkable articles cannot be wrapped around the object to be protected. Additionally, the heat-shrinkable article would have to be cut off the protected object, which is a time consuming process that may damage the protected object. Further, the protective tubes would need to be discarded after a single use, which is not cost effective.

What is needed, therefore, is a process and article for the temporary protection of extended articles which is cost effective, easily adaptable to different shapes and configurations, and which may be assembled and disassembled from the protected article as quickly as possible. It is also desirable if the protective article may be reused multiple times.

SUMMARY OF THE INVENTION

The problems and needs described above are solved by the invention described herein. The present invention provides a jacket for the protection of the extended article which can be obtained from the following process:

A heat-shrinkable tube is selected which has a length which essentially corresponds to the length of the section of the extended article that is intended to be protected, and an inner diameter exceeding the largest diameter of the section to be protected. The heat-shrinkable tube is able, through the application of heat, to shrink onto an article and conform itself substantially to the given geometry of the article. The tube remains in the shrunk-down position after cooling. Preferably, the heat-shrinkable tube is shrunk onto a mold body having dimensions which essentially correspond to the dimensions of the section of the article to be protected and which can withstand the temperature and forces occurring at a heat-shrink process.

The heat-shrinkable tube is placed over the mold body, and heat is applied to the tube so that it shrinks down onto the body. After cooling, the now shrunk tube is cut along its longitudinal length so that an open or split sleeve with two lateral sides is created. The split sleeve is then removed from the mold body.

Preferably, the two lateral sides of the split sleeve are provided with mechanical fastening means which are selected so that the sleeve may be placed over the section of the extended article to be protected and then securely fastened about the section through the use of the mechanical fastening means.

Heat-shrinkable tubes of the type contemplated herein are well known, for example, in the electrical field for the protection of electrical splices. They consist of materials well known to one skilled in the art. Those tubes are pre-expanded under a suitably high temperature and cooled in the expanded state so that they remain in an expanded condition. When sufficient heat is applied to the expanded tube, the tube shrinks back into its original position configuration, provided that it is not blocked from doing so. In the invention described herein, the tube shrinks onto the mold body and substantially conforms itself onto the mold body. After the tube is cooled, the tube is again mechanically stable. Therefore, after cutting the tube along its length, the tube can be removed from the mold body and retain its "shrunk-down" shape. The invention, therefore, takes advantage of the very specific features of a typical heat-shrinkable tube.

Preferably the heat-shrinkable tube should be chosen so that it is capable of shrinking down to the smallest diameter of the section of the article to be protected. In the most general sense, such a sleeve could be fixed onto the extended article with additional means such as tapes, ropes, etc. However, it is preferred to attach fastening means to the split sleeve, where the fastening means remain with the split sleeve. In this manner, a product is obtained which can be opened and placed over the extended article, then closed onto the article by the mechanical fastening means. Used in this manner for the intended purpose, such as transportation, the split sleeve can be reopened very easily and reused for a similar purpose.

When temporarily fastened about the extended article, the split sleeve provides protection to the article and especially gives the protected system additional desired stability and rigidity which is needed during transportation.

Preferably, the fastening means are attached to the lateral sides of the sleeve which been created through the cutting of the sleeve. The fastening means could be of any type. They might be, for example, a zipper or individual fastening means of the hook and loop type, or they may comprise micro-structured surfaces which are capable to interact with each other. The fastening means as such can be attached to the lateral sides of the sleeves by any means. These could be mechanical, such as rivets, or utilizing a method which is similar to the sewing of such a component to the sleeve, or they may be attached through an adhesive which could be either an adhesive layer which has been laminated onto the components of the fastening means, or a separate pressure-sensitive tape. Those tapes are known, for example, as double-sided tapes where one side is placed onto the lateral side of the sleeve. An eventually used liner is removed and on the second side of the tape a fastening component is adhered thereto.

BRIEF DESCRIPTION OF THE DRAWINGS

The invention will be best understood from the accompanying drawings which illustrate a preferred embodiment of the invention. It is to be understood, however, that the scope of the invention is not limited thereto, but only defined by the claims.

FIG. 8 is a cross-sectional view taken along line 8—8 of FIG. 9, showing an alternate embodiment of the protective jacket.

FIG. 9 is an elevational view of the embodiment of FIG. 8.

FIG. 10 is an elevational view of the embodiment of FIG. 9, taken along line B—B in FIG. 9.

DETAILED DESCRIPTION OF THE INVENTION

The inventive jacket for the protection of an extended or longitudinal article and the process for forming the protective jacket are shown and hereby described in more detail.

Figure 1:
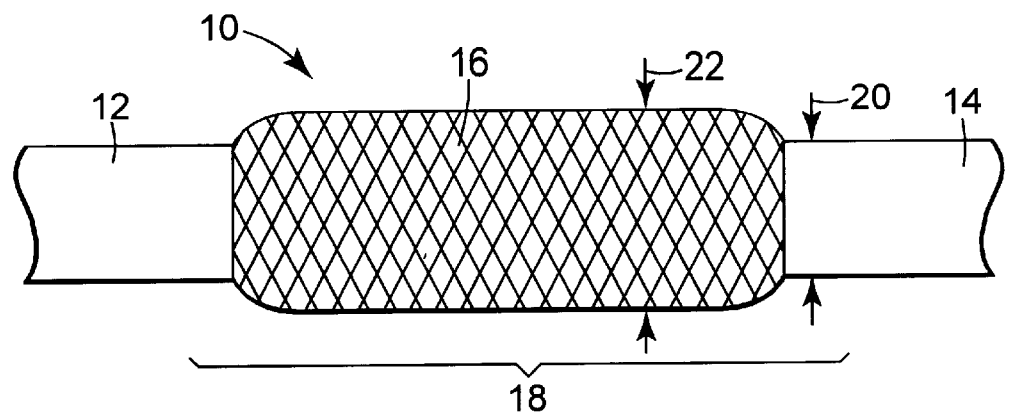
FIG. 1 illustrates an example of an extended article to be protected, such as a part of an automobile exhaust system.

FIG. 1 illustrates an extended article 10 which requires protection and/or reinforcement during shipping. The extended article 10 in this particular example represents a portion of an automobile exhaust system consisting of two exhaust pipes 12 and 14 and a flexible connection 16 which requires protection. Flexible connection 16 may, for example, consist of a heat-resistant flexible tube which connects the exhaust pipes 12, 14 and is used for different purposes, such as preventing vibrations from being transmitted between exhaust pipes 12, 14. It is preferred to protect at least the flexible connection 16 of this system, such as by protecting the section 18 which is slightly larger than flexible connection 16 itself. It will be noted that the section 18 to be protected has in this particular example a relatively large middle portion with a diameter 22 and smaller outer portions with a diameter 20. Of course, the geometry of the section 18 to be protected can vary within a wide range. Nevertheless, in any case the section 18 to be protected can be defined by its diameters which range from a minimum diameter 20 to a maximum diameter 22. These values are important for the appropriate selection of the components for the protective jacket.

Figure 2:
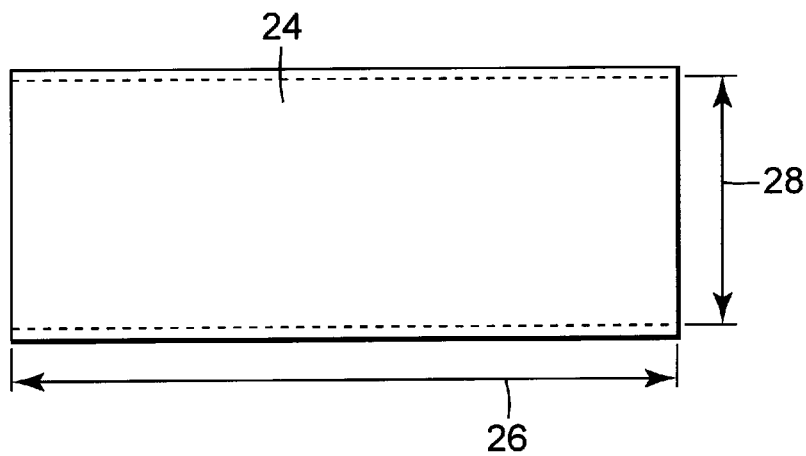
FIG. 2 illustrates a heat-shrinkable tube of the type generally known from which a protective jacket for the extended article of FIG. 1 is formed according to the process of this invention.

FIG. 2 shows a heat-shrinkable tube 24 having a length 26 which essentially corresponds to the length of the section 18 to be protected, as depicted in FIG. 1. The length 26 is preferably somewhat longer than the section 18 given in FIG. 1. However, it is essential that there is a basic correspondence between these two lengths. The inner diameter 28 of heat-shrinkable tube 24 must to be larger than the maximum diameter 22 of the section 18 which is to be protected.

Figure 3:
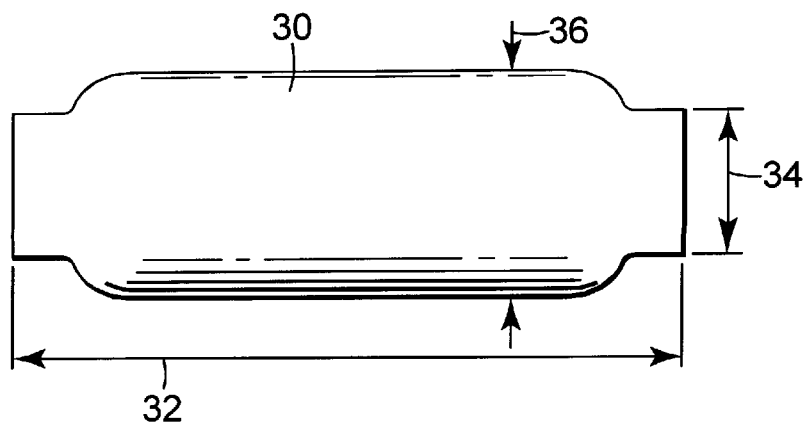
FIG. 3 illustrates a mold body which will be used to shape the heat-shrinkable tube of FIG. 2.

FIG. 3 shows a mold body 30 having a length 32 which substantially corresponds to the length 26 of the heat-shrinkable tube 24 in FIG. 2. However, length 32 of mold body 30 may also be larger than that of heat-shrinkable tube 24. The shape of mold body 30 essentially matches the shape of the section 18 to be protected as depicted in FIG. 1. However, it may be desired to provide mold body 30 somewhat larger dimensions than the section 18 to be protected, as will become apparent below. Therefore, the minimum diameter 34 and maximum diameter 36 of the mold body 30 may be larger than the corresponding minimum diameter 20 and maximum diameter 22 of the section 18 to be protected.

Mold body 30 is made from any known material capable of withstanding the temperatures applied to heat-shrinkable tube 24 and the corresponding forces that occur during the heat-shrink process. For example, mold body 30 could consist of wood, metal, or a plastic material capable of withstanding the temperature and pressure. A non-metallic material for mold body 30 is preferred.

Figure 4:
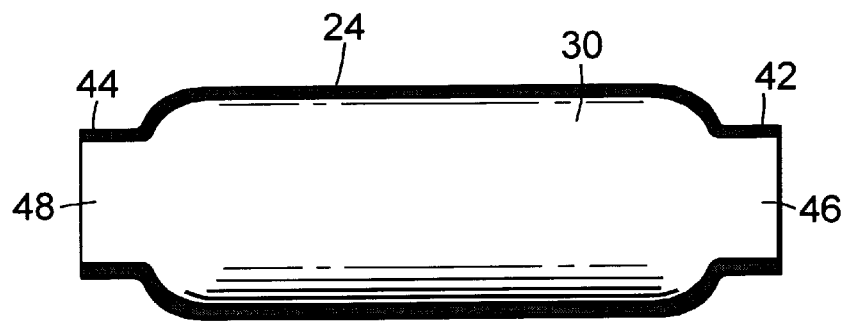
FIG. 4 is a cross-sectional view of the heat-shrinkable tube of FIG. 2 on the mold body of FIG. 3.

FIG. 4 illustrates the heat-shrinkable tube 24 after it has been placed over the mold body 30 and heated. Heat may be applied in any well known manner, such as by an open flame, heating coil, hot air or other method. After the application of heat, heat-shrinkable tube 24 shrinks down to conform to the specific shape of mold body 30. To ensure that heat-shrinkable tube 24 conforms as much as possible with all portions of mold body 30, a heat-shrinkable tube 24 is chosen which is capable of shrinking down to at least the minimum diameter 20 of the section 18 to be protected. In this manner it can be ensured that the two ends 42, 44 of the shrunk down tube 24 are in intimate contact with the corresponding ends 46, 48 of mold body 30.

Figure 5:
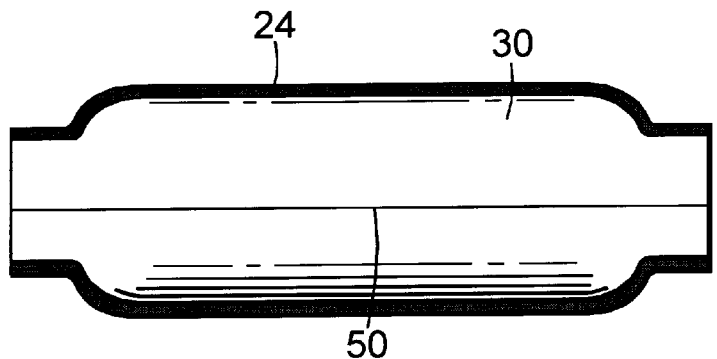
FIG. 5 is a cross-sectional view corresponding to FIG. 4, illustrating the separation line where the tube is cut in a longitudinal direction.
Figure 6:
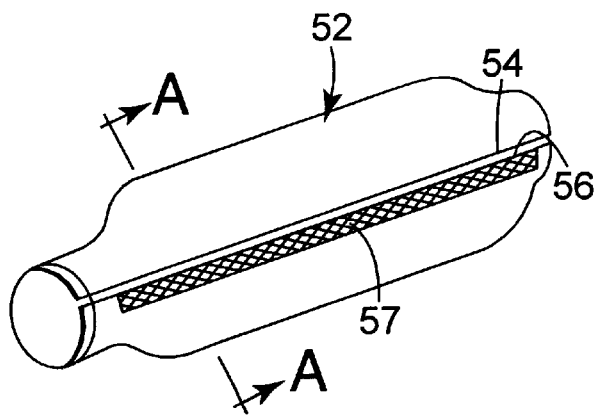
FIG. 6 is a perspective view of the protective jacket for the extended article, as created by the process described herein and provided with a releasable fastening means.

As shown in FIG. 5, after tube 24 is shrunk onto the mold body 30, tube 24 is cut open longitudinally along line 50. In this manner a split sleeve 52 is created, as shown in a perspective view in FIG. 6. Having been cut along line 50, split sleeve 52 is provided with two longitudinal lateral sides 54, 56. Split sleeve 52 is shown in FIG. 6 after its removal from mold body 30. Furthermore, it is shown that on the lateral side 56 a mechanical fastening means 57 is attached.

Figure 7:
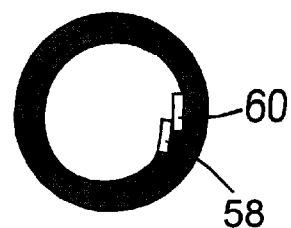
FIG. 7 is a cross-sectional view taken along line A—A of FIG. 6, depicting the components of the releasable fastening means.

FIG. 7 illustrates that mechanical fastening means 57 includes a first fastening component 58 which secures to a second fastening component 60. Components 58, 60 of mechanical fastening means 57 are attached to the lateral sides 54, 56 of split sleeve 52, such that when the two lateral sides 54 and 56 are overlapped fastening components 58, 60 interact to hold split sleeve 52 closed. Accordingly, it is advantageous that mold body 30 have slightly larger dimensions than the section 18 to be protected, as the extra material allows lateral sides 54, 56 to overlap each other when places on section 18. Fastening means 57 preferably are hook and loop type fasteners, such as SJ3551 from the Minnesota Mining & Manufacturing Company (USA), sold under the name Dual Lock™. Other types of fastening means may be used, such as snaps, pressure sensitive adhesives, etc. The fastening means 57 may be secured to lateral sides 54, 56 in any suitable manner, such as by adhesives, rivets, or the like.

FIGS. 8–10 illustrate an alternate embodiment of the invention. Split sleeve 62 is substantially identical to the previously described split sleeve 52. Split sleeve 62 includes a middle portion 64 having a somewhat larger diameter for conforming to maximum diameter 22 of the section 18 to be protected and two end portions 66, 68 having a smaller diameter for conforming to minimum diameter 20 of the section 18 to be protected. As described above, the split sleeve 62 is slit open longitudinally along one side. The longitudinal slit 70 can be seen in FIGS. 9 and 10.

In the particular configuration of FIGS. 8–10, the split sleeve 62 can be closed over the section 18 to be protected through the use of mechanical fastening means 72, 74, 76. Although three fastening means are illustrated, it will be readily recognized that more or fewer fastening means may be used, depending for example, on the length of the split sleeve 62. Fastening means 72 consist of two components 78, 80, correspondingly fastening means 74 has the components 82, 84 and fastening means 76 has the components 86, 88. The fixation of components 78, 80, 82, 84, 86, 88 can be seen from FIG. 8 and 10.

The components 78, 80, 82, 84, 86, 88 may be attached to split sleeve 62 in any suitable manner, such as by adhesives, rivets, etc. As shown in FIGS. 8–10, fastening components 78, 82, 86 are adhered to split sleeve 62 using an adhesive (not shown), while fastening components 80, 84, 88 are attached to split sleeve 62 by the rivets 90, 92, 94. The manner of attaching components 78, 80, 82, 84, 86, 88 shown in FIGS. 8–10 is intended to be illustrative only, as other methods of attachment are contemplated. Those skilled in the art will readily recognize that many other attachment methods may be used, and the particular attachment method selected may depend on many factors, such as the required durability of the attachment, cost, operating environment, etc.

The essential feature of the embodiments shown herein is that, in a preferred embodiment, the fastening means form an integral part of the entire protective jacket, as for they are intended to remain with the split sleeves 52, 62. In the example provided herein, the automobile exhaust system is protected and mechanically stabilized by the split sleeves 52, 62 by placing a split sleeve over the section 18 to be protected. Subsequently, the split sleeve is closed using the fastening means by having the mating components overlap and engage each other. In the embodiments described above, the fastening components are preferably of the hook and loop type, such as SJ3551 from the Minnesota Mining & Manufacturing Company (USA), sold under the name Dual Lock™, although other fastening means may be used. For example, the fastening components could be micro-structured surfaces which are adapted to releasably engage each other, or snap closures could be provided on the mating components of the fastening means, or a pressure sensitive adhesive could be used.

The main advantage of the split sleeves 52, 62 described herein is that they can be easily applied and removed from the automobile exhaust, and they also may be used repetitively. Therefore, it might be advantageous to mark onto the sleeve a message such as "Return to manufacturer" or a similar message. An additional advantage of the invention described herein is that a multiplicity of configurations may be easily formed, with each configuration requiring only a simple forming mold. Because multiple uses could be devised of for such a protective jacket and its method for manufacture, the invention must not be limited to the specific geometric embodiments described herein.

What is claimed is:

1. A process for cremating a jacket for the protection of at least a section of an extended article of a given geometry, the section to be protected having a minimum diameter and a maximum diameter, the process comprising the steps of:

selecting a heat-shrinkable tube having a length corresponding to a length of the section to be protected, and an inner diameter exceeding the maximum diameter of the section to be protected, the heat-shrinkable tube being capable through the application of heat of shrinking onto the section to be protected and substantially conforming itself to the geometry of the section to be protected, and remaining in the conforming position after cooling;

providing a mold body having external dimensions substantially matching dimensions of the section to be protected;

placing the heat-shrinkable tube over the mold body;

applying heat to the heat-shrinkable tube to cause the heat shrinkable tube to conform to the shape of the mold body;

cutting the heat-shrinkable tube longitudinally to create an open sleeve with first and second lateral sides; and removing the open sleeve from the mold body.

2. The process of claim 1, wherein the heat-shrinkable tube is capable of shrinking down to a diameter smaller than the minimum diameter of the section to be protected.

3. The process of claim 1 comprising the additional step of providing the first and second lateral sides of the open sleeve with mechanical fastening means which allow the open sleeve to be secured over the section to be protected.

4. The process of claim 1, wherein the external dimensions of the mold body exceed the corresponding dimensions of the section to be protected to an extent that allows the first and second lateral sides of the open sleeve to overlap each other when the open sleeve is placed over the section to be protected.

5. The process of claim 3, wherein the fastening means comprises a first and a second component, the first and second components attached to the first and second lateral sides of the open sleeve, respectively.

6. The process of claim 5, wherein the first and second components of the fastening means are of the hook and loop type.

7. The process of claim 5, wherein the first and second components of the fastening means comprise micro-structured surfaces adapted to interact with each other.

8. The process of claim 5, wherein at least one component of the fastening means is attached to the open sleeve by mechanical means.

9. The process of claim 8, wherein the mechanical means comprise rivets.

10. The process of claim 5, wherein at least one component of the fastening means is attached to the open sleeve by an adhesive.

11. The process of claim 10, wherein the adhesive is laminated to a surface of the at least one component of the fastening means.

12. The process of claim 10, wherein the adhesive is a pressure-sensitive adhesive.

* * * * *